(12) United States Patent
Moriya et al.

(10) Patent No.: US 8,558,657 B2
(45) Date of Patent: Oct. 15, 2013

(54) COMMUNICATION SYSTEM AND COMMUNICATION METHOD

(75) Inventors: Koichi Moriya, Chiba (JP); Yoshimasa Kimura, Chiba (JP); Fumio Suzuki, Chiba (JP); Shoji Hatano, Aichi (JP); Noritoshi Hino, Aichi (JP); Masahito Taneda, Aichi (JP)

(73) Assignee: Otsl Inc. (JP)

( * ) Notice: Subject to any disclaimer, the term of this patent is extended or adjusted under 35 U.S.C. 154(b) by 234 days.

(21) Appl. No.: 12/737,775

(22) PCT Filed: Aug. 6, 2009

(86) PCT No.: PCT/JP2009/063917
§ 371 (c)(1),
(2), (4) Date: Apr. 22, 2011

(87) PCT Pub. No.: WO2010/024098
PCT Pub. Date: Mar. 4, 2010

(65) Prior Publication Data
US 2011/0207501 A1 Aug. 25, 2011

(30) Foreign Application Priority Data
Aug. 29, 2008 (JP) .................................. 2008-222687

(51) Int. Cl.
*G05B 23/02* (2006.01)
*H04J 3/06* (2006.01)
*H04L 27/00* (2006.01)

(52) U.S. Cl.
USPC .............. 340/3.2; 370/350; 375/295; 375/316

(58) Field of Classification Search
None
See application file for complete search history.

(56) References Cited

U.S. PATENT DOCUMENTS

| 2006/0251045 | A1* | 11/2006 | Okubo ......................... 370/350 |
| 2007/0021155 | A1* | 1/2007 | Yu et al. ......................... 455/574 |
| 2007/0274281 | A1* | 11/2007 | Frandsen et al. .............. 370/350 |
| 2008/0167066 | A1* | 7/2008 | Yoon et al. ................. 455/550.1 |
| 2011/0211512 | A1* | 9/2011 | Kimura et al. ................ 370/311 |

FOREIGN PATENT DOCUMENTS

| JP | 11 18143 | 1/1999 |
| JP | 2005167823 | 6/2005 |
| JP | 2006 74326 | 3/2006 |

* cited by examiner

*Primary Examiner* — George Bugg
*Assistant Examiner* — Renee Dorsey
(74) *Attorney, Agent, or Firm* — Adams & Wilks

(57) ABSTRACT

A communication system has a server, base station devices, and terminal devices. The server notifies each base station device of a transmission order of a synchronization signal and of the base station device that is designated as a reference. Each one of the base station devices transmits a synchronization signal to the corresponding terminal device based on the transmission order in a case where the one base station device has been designated as the reference. In the case where the one base station device has not been designated as the reference, the one base station device transmits the synchronization signal to the corresponding terminal device at a timing calculated based on a reception timing by the corresponding terminal device of a synchronization signal received from the reference base station device, a transmission order of the reference base station device, and the transmission order of the one base station device.

18 Claims, 10 Drawing Sheets b : SYNCHRONIZATION DATA
c : GUARD TIME

COMMUNICATION SYSTEM AND COMMUNICATION METHOD

CROSS-REFERENCE TO RELATED APPLICATIONS

This application is a U.S. national stage application of International Application No. PCT/JP2009/063917 filed Aug. 6, 2009, claiming a priority date of Aug. 29, 2008, and published in a non-English language.

BACKGROUND OF THE INVENTION

1. Technical Field

The present invention relates to a communication system and a communication method for controlling a timing at which a base station device transmits a synchronization signal to a terminal device.

2. Background Art

Conventionally, a synchronization signal is transmitted/received between a terminal device and a base station device which are communicably connected to each other by radio, and, by using the synchronization signal, synchronization of a signal is achieved between the terminal device and the base station device. Further, the synchronization signal is also used when a plurality of base station devices are controlled so as not to transmit data at the same timing thereamong to terminal devices accommodated by the respective own devices. Patent Literature 1 discloses a technology of performing control so as not to transmit a synchronization signal at the same time as when another base station device transmits a synchronization signal. Further, Patent Literature 2 discloses a technology of setting information in a base station device in advance so that base station devices do not transmit synchronization signals at the same time.

CITATION LIST

Patent Literature

Patent Literature 1: JP 2993469 B2
Patent Literature 2: JP 3749907 B2

Here, a synchronization signal, which is to be transmitted from a base station device to a terminal device, needs to be controlled so as not to collide with a synchronization signal to be transmitted from another base station device. At the same time, it is desired to, by making such processing as simple as possible, reduce processing loads imposed on the base station device and a server that sets a timing of the synchronization signal for the base station device.

In view of the above, it is an object of the present invention to provide a communication system and a communication method which are capable of reducing processing loads imposed on a base station device and a server that sets a timing of a synchronization signal for the base station device.

SUMMARY OF THE INVENTION

In order to achieve the above-mentioned object, according to the present invention, there is provided a communication system, including: a management device; a plurality of base station devices; and terminal devices each accommodated by one of the plurality of base station devices, in which: the management device includes: transmission order notification means for providing, to each of the plurality of base station devices, notification of a transmission order of a synchronization signal; and reference base station device notification means for providing, to the each of the plurality of base station devices, notification of a base station device that is to serve as a reference out of the plurality of base station devices; and the plurality of base station devices each include synchronization signal transmission means for transmitting the synchronization signal based on the transmission order in a case where an own device is designated as the base station device that is to serve as the reference by the management device, and transmitting the synchronization signal at a timing calculated based on a reception timing of a synchronization signal received from the base station device serving as the reference, a transmission order of the base station device serving as the reference, and the transmission order of the own device in a case where the own device is not designated as the base station device that is to serve as the reference by the management device.

Further, according to the present invention, in the above-mentioned communication system, in a case where the own device is not designated as the base station device that is to serve as the reference by the management device, and where a base station device that comes after the own device in transmission order is designated as the base station device that is to serve as the reference, the synchronization signal transmission means of the each of the plurality of base station devices transmits a synchronization signal after next at the timing calculated based on the reception timing of the synchronization signal received from the base station device serving as the reference, the transmission order of the base station device serving as the reference, and the transmission order of the own device.

Further, according to the present invention, in the above-mentioned communication system, the synchronization signal transmission means of the each of the plurality of base station devices provides a guard time between a transmission time of the synchronization signal, which is transmitted from another base station device notified of the transmission order that is immediately before the transmission order of the own device, and a transmission time of the synchronization signal to be transmitted from the own device.

Further, according to the present invention, in the above-mentioned communication system, the synchronization signal transmission means of the each of the plurality of base station devices continuously transmits the synchronization signal a plurality of times with a different piece of identification information assigned thereto, and each of the terminal devices is configured to: perform processing of achieving synchronization with the one of the plurality of base station devices based on the synchronization signal received first after an own terminal is activated; and correct a time of a next activation timing based on the identification information assigned to the synchronization signal and store the corrected time.

Further, according to the present invention, there is provided a communication method which is used for a communication system including: a management device; a plurality of base station devices; and terminal devices each accommodated by one of the plurality of base station devices, the communication method including: providing, by transmission order notification means of the management device, to each of the plurality of base station devices, notification of a transmission order of a synchronization signal; providing, by the reference base station device notification means of the management device, to the each of the plurality of base station devices, notification of a base station device that is to serve as a reference out of the plurality of base station devices; and transmitting, by synchronization signal transmission means of the each of the plurality of base station devices, the synchronization signal based on the transmission order in a case where an own device is designated as the base station device that is to serve as the reference by the management device, and transmitting the synchronization signal at a timing calculated based on a reception timing of a synchronization signal received from the base station device serving as the reference, a transmission order of the base station device serving as the reference, and the transmission order of the own device in a case where the own device is not designated as the base station device that is to serve as the reference by the management device.

Further, according to the present invention, the above-mentioned communication method further includes providing, by the synchronization signal transmission means of the each of the plurality of base station devices, a guard time between a transmission time of the synchronization signal, which is transmitted from another base station device notified of the transmission order that is immediately before the transmission order of the own device, and a transmission time of the synchronization signal to be transmitted from the own device.

Further, according to the present invention, the above-mentioned communication method further includes: continuously transmitting, by the synchronization signal transmission means of the each of the plurality of base station devices, the synchronization signal a plurality of times with a different piece of identification information assigned thereto; performing, by each of the terminal devices, processing of achieving synchronization with the one of the plurality of base station devices based on the synchronization signal received first after an own terminal is activated; and correcting, by the each of the terminal devices, a time of a next activation timing based on the identification information assigned to the synchronization signal and storing the corrected time.

According to the present invention, a management server provides, to the base station device, notification of the transmission order of the synchronization signal and of the base station device that is to serve as a reference station. Based on the synchronization signal transmitted from the base station device designated as the reference station through the notification, each of the base station devices not serving as the reference station determines the timing of the synchronization signal by the own device and transmits the synchronization signal. With this configuration, the management server does not need to perform processing of calculating when the synchronization signal is to be transmitted from each of the base station devices, and hence it is possible to reduce the processing load imposed on the management server. Further, the base station device serving as the reference station only needs to transmit the synchronization signal at a synchronization signal transmission timing corresponding to the transmission order in a synchronization period after reception of the notification of the transmission order from the management server. As a result, the base station device serving as the reference station does not need to perform processing of calculating when to transmit the synchronization signal, and hence it is possible to reduce the processing load imposed thereon.

DETAILED DESCRIPTION OF THE INVENTION

Hereinbelow, description is given of a communication system according to an embodiment of the present invention with reference to the drawings.

Figure 1:
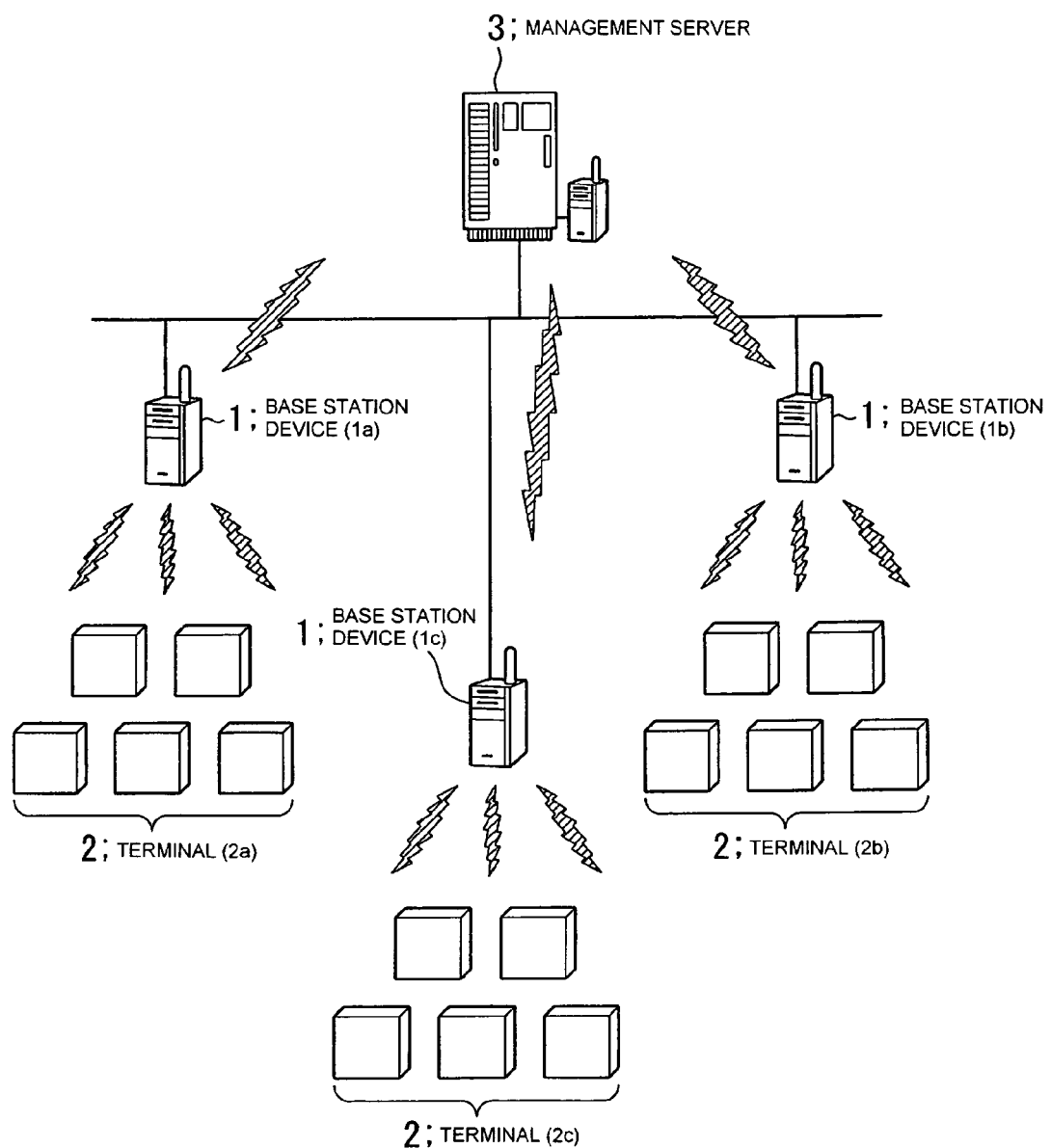
FIG. 1 is a block diagram illustrating a configuration of a communication system.

FIG. 1 is a block diagram illustrating a configuration of the communication system according to the embodiment.

In FIG. 1, reference numeral 1 denote base station devices; 2, terminal devices that perform radio communication to the base station devices 1; and 3, a management server that manages a transmission timing of a synchronization signal of the base station devices. The base station devices 1 and the management server 3 are communicably connected to each other. In this figure, three base station devices 1, that is, base station devices 1a to 1c, are communicably connected to the management server 3, and synchronization signals transmitted from the base station devices 1a to 1c are respectively transmitted to terminal device groups 2a to 2c accommodated by the respective base station devices 1. The base station devices 1 are distanced from each other by such a distance that a synchronization signal from one base station device 1 can be received by another base station device 1 other than the base station device 1 that has transmitted the synchronization signal.

Figure 2:
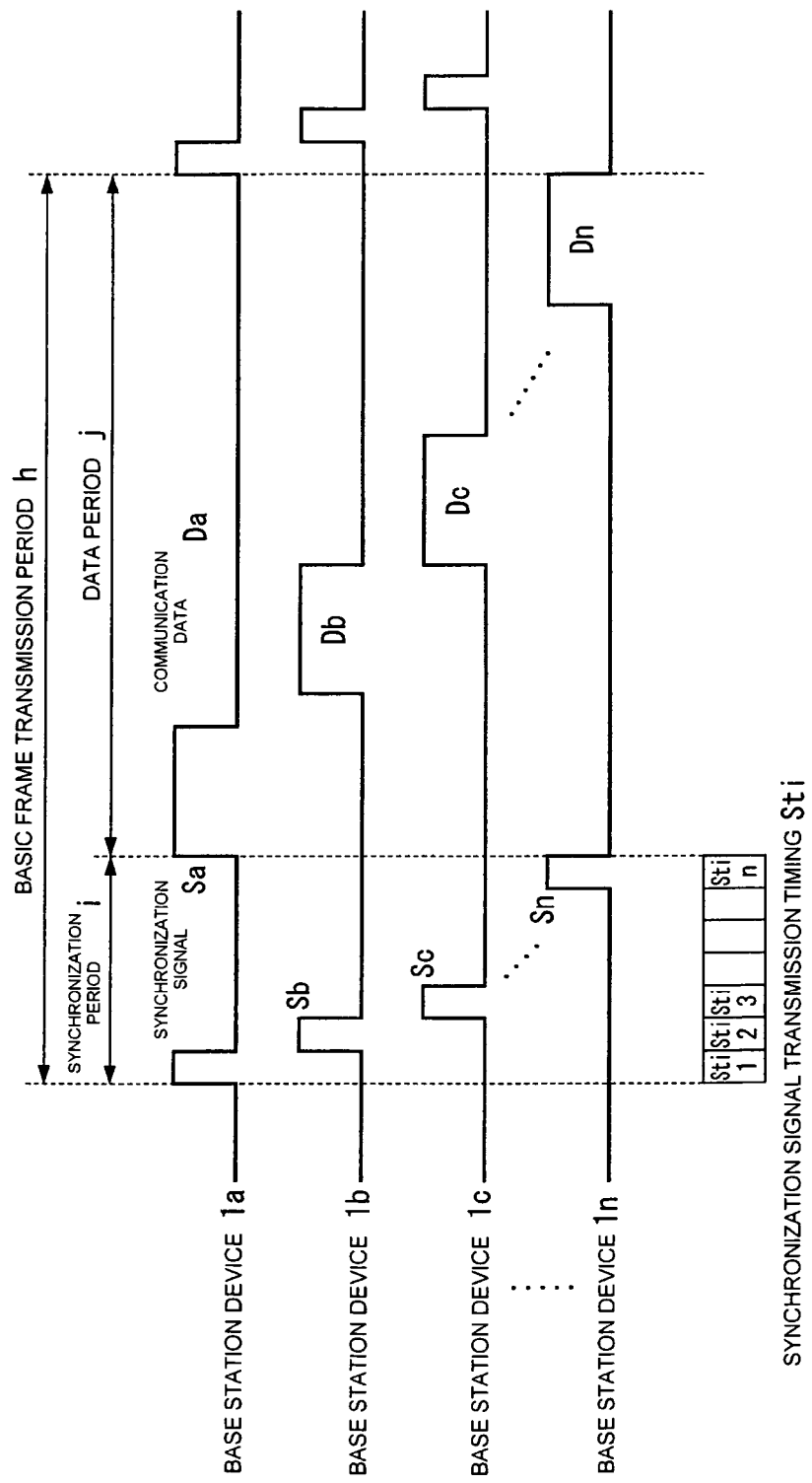
FIG. 2 is a diagram illustrating an overview of operations of base station devices.

FIG. 2 is a general timing chart of transmission signals transmitted from the base station devices 1 to the terminal devices 2 according to the present invention.

The transmission signal includes a synchronization signal S for achieving synchronization between each base station device 1 and each terminal device 2, and communication data D in which real data is transmitted. A basic frame transmission period h includes a synchronization period i, in which the synchronization signal S is transmitted, and a data period j, in which the communication data D is transmitted.

Then, as illustrated in FIG. 2, the base station device 1a transmits a synchronization signal Sa at a synchronization signal transmission timing Sti1, which is the first in transmission order in the synchronization period i. Further, the base station device 1b transmits a synchronization signal Sb at a synchronization signal transmission timing Sti2, which is the second in transmission order in the synchronization period i, and the base station device 1c transmits a synchronization signal Sc at a synchronization signal transmission timing Sti3, which is the third in transmission order in the synchronization period i. Further, after the transmission of the synchronization signal S, each of the base station devices 1a to 1c transmits the communication data D in the data period j. Here, in a case where the transmission signals have the same frequency (time division) as illustrated in FIG. 2, the base station devices 1 transmit respective pieces of the communication data D one after another so that transmission periods of the pieces of the communication data D of the base station devices do not overlap each other. For example, if a transmission time or a transmission end time of communication data Da is stored in the synchronization signal Sa transmitted from the base station device 1a, whose synchronization signal transmission timing is set as the first, the base station device 1b, whose synchronization signal transmission timing is the second, refers to the transmission end time of the communication data Da of the base station device 1a to start the transmission of communication data Db thereafter. Further, similarly, the base station device 1c transmits communication data based on the transmission end time of the communication data Db contained in the synchronization signal Sb transmitted by the base station device 1b.

Figure 3:
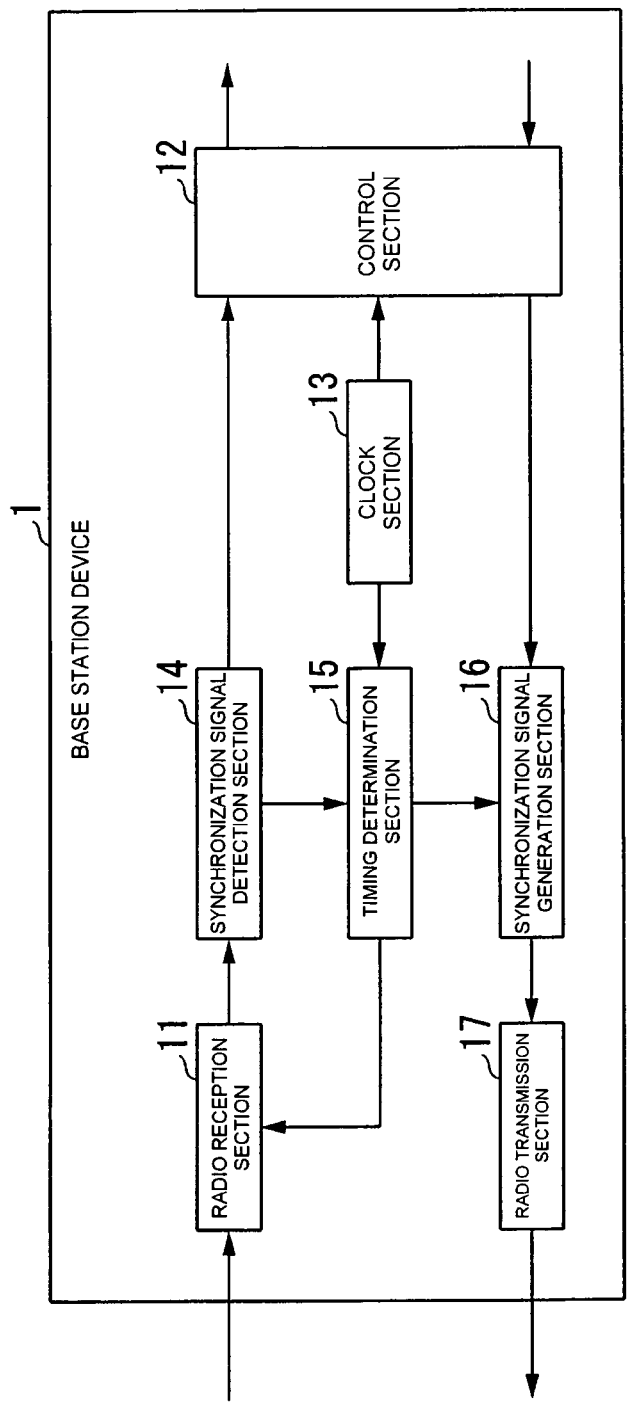
FIG. 3 is a functional block diagram of the base station device.

FIG. 3 is a functional block diagram of the base station device.

As illustrated in FIG. 3, the base station device 1 includes a radio reception section 11, a control section 12, a clock section 13, a synchronization signal detection section 14, a timing determination section 15, a synchronization signal generation section 16, and a radio transmission section 17.

Then, in the communication system according to this embodiment, the management server 3 provides notification of the transmission order of the synchronization signal to each of the plurality of base station devices 1, and further provides, to each of the plurality of base station devices 1, notification of a base station device 1 that is to serve as a reference station out of the plurality of base station devices 1. Then, if an own device is designated as the base station device that is to serve as the reference station by the management server 3, the base station device 1 performs processing of transmitting the synchronization signal S to the terminal device 2 based on the transmission order. If the own device is not designated as the base station device that is to serve as the reference station by the management server 3, the base station device 1 performs processing of transmitting the synchronization signal S to the terminal device 2 at a timing calculated based on a reception timing of a synchronization signal received from the base station device 1 serving as the reference station, the transmission order of that base station device 1 serving as the reference station, and the transmission order of the own device.

Next, detailed description is given of processing performed by each of the management server, the base station device, and the terminal device in the communication system.

First, the management server 3 provides, to each of the base station devices 1, notification of the transmission order of the synchronization signal and notification indicating which base station device is to serve as the reference station. Further, the management server 3 provides notification of a start time of the synchronization period i of the basic frame transmission period h. Here, as illustrated in FIG. 2, the base station device 1 transmits the synchronization signal S to the terminal device 2 in the synchronization period i, and transmits the communication data D, which is to be used for processing, to the terminal device 2 in the data period j. This counting of the basic frame transmission period h is repeated with the base station device 1 and the terminal device 2 in synchronization with each other. Further, the synchronization period i is divided to set the timings Sti for transmitting the synchronization signals S, and the base station device 1 transmits the synchronization signal S at a synchronization signal transmission timing Sti corresponding to the transmission order notified by the management server 3 out of the plurality of synchronization signal transmission timings Sti in the synchronization period i. For example, if the transmission order of the base station device 1b is the second, the base station device 1b transmits the synchronization signal Sb at the synchronization signal transmission timing Sti2, which is the second in the synchronization period i.

Then, in this embodiment, as illustrated in FIG. 1, three base station devices 1, that is, the base station devices 1a, 1b, and 1c, are connected to the management server 3. Here, the management server 3 transmits, to the base station devices 1a, 1b, and 1c, information specifying the transmission orders as the first, the second, and the third, respectively, and also transmits information indicating that the base station device 1a is the base station device that is to serve as the reference station to each of the base station devices 1a to 1c. In the base station devices 1a to 1c, the radio reception section 11 receives information on the transmission order and information on the base station device 1a serving as the reference station, and the control section 12 records, on a memory or the like, the received information on the transmission order and information indicating whether or not the own device is the base station device serving as the reference station.

The control section 12 of the base station device 1a serving as the reference station provides notification prompting the timing determination section 15 to determine the transmission timing of the synchronization signal. Next, the timing determination section 15, which receives clock signals from the clock section 13, transmits the synchronization signal S at the synchronization signal transmission timing Sti corresponding to the transmission order, which has been notified to the own device, in the synchronization period i of the basic frame transmission period h. Specifically, in this situation, notification has been provided that the base station device 1a is the reference station, and the transmission order thereof is the first. Therefore, the synchronization signal Sa is transmitted at the synchronization signal transmission timing Sti1, which is the first in the synchronization period i, without performing any particular timing correction or the like.

Figure 4:
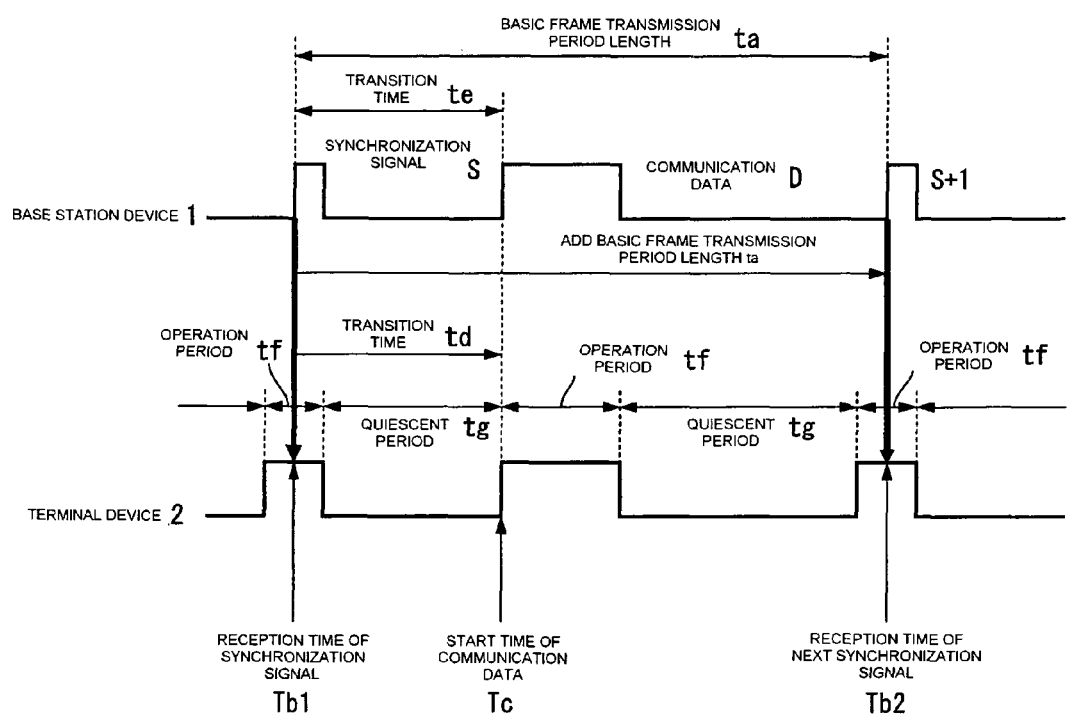
FIG. 4 is a diagram illustrating an overview of operations of the base station device serving as a reference station and a terminal device.

FIG. 4 is a diagram illustrating an overview of operations of the base station device 1 serving as the reference station and the terminal device 2.

As illustrated in the figure, when the base station device 1 transmits the synchronization signal S, the terminal device 2 accommodated by the base station device 1 detects, based on the synchronization signal S, the reception timing of the communication data D, which is to be transmitted from the base station device 1 after the transmission of the synchronization signal S, and the reception timing of a synchronization signal S+1, which is to be received next after the reception of the synchronization signal S. Specifically, the synchronization signal S has stored therein information for identifying a time length ta of the basic frame transmission period h and a start time Tc of the communication data D.

Then, the terminal device 2 receives the synchronization signal S from the base station device 1, reads the time length ta of the basic frame transmission period h, and adds the time length ta of the basic frame transmission period h to a reception time Tb1 of the synchronization signal S, to thereby calculate a time Tb2, at which the next synchronization signal S+1 is to be received. Further, the terminal device 2 receives the synchronization signal S transmitted from the base station device 1, reads the information for identifying the start time Tc of the communication data D, which is stored in the synchronization signal S, and calculates, based on the information, the reception time of the communication data D to be transmitted from the base station device 1 after the reception of the synchronization signal S. For example, if the information for identifying the start time Tc of the communication data D, which is stored in the synchronization signal S, indicates a transition time td since the transmission (reception) time Tb1 of the synchronization signal S of the base station device 1, the terminal device 2 adds the transition time read from the synchronization signal to the reception time of the synchronization signal, and thus can calculate the reception time of the communication data. Note that, this processing of the terminal device 2 is equally performed by both a terminal device accommodated by the base station device serving as the reference station and a terminal device accommodated by the base station device not serving as the reference station.

Then, the terminal device 2 calculates the start time Tc of the communication data D to be transmitted from the base station device 1 after the reception of the synchronization signal S, and the reception time Tb2 of the next synchronization signal S+1, thereby being activated to operate only in time periods in which the synchronization signal S and the communication data D are received (operation periods tf), and entering into a sleep state in the other time periods than the operation periods tf (quiescent periods tg). As a result, it is possible to reduce the power consumption of the terminal device 2. Owing to this, in a case where an internal battery is used, a long-time operation of the terminal device 2 can be achieved.

Figure 5:
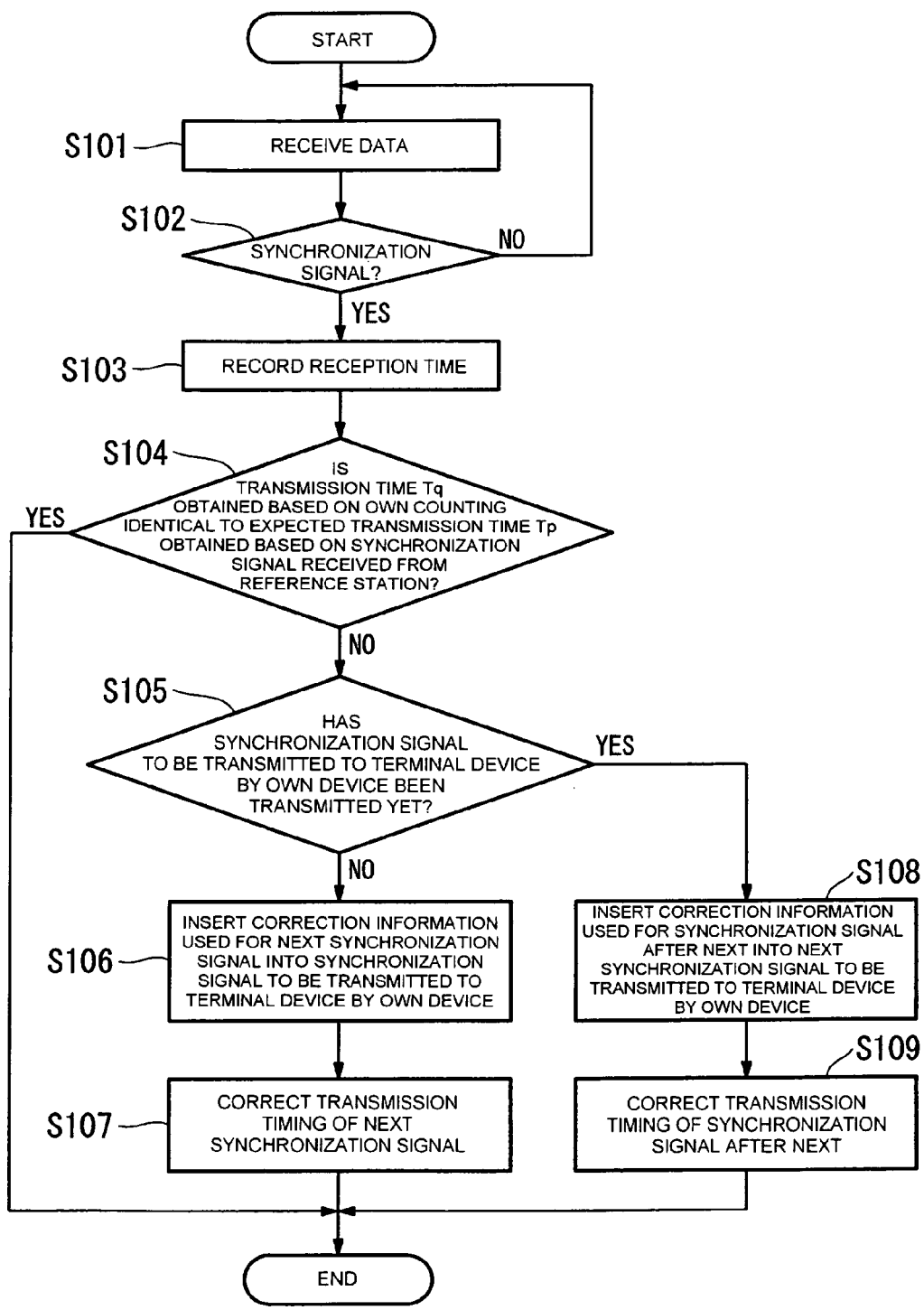
FIG. 5 is a first diagram illustrating a flow of synchronization signal transmission processing performed by the base station device not serving as the reference station.

FIG. 5 is a first diagram illustrating a flow of synchronization signal transmission processing performed by the base station device not serving as the reference station.

Figure 6:
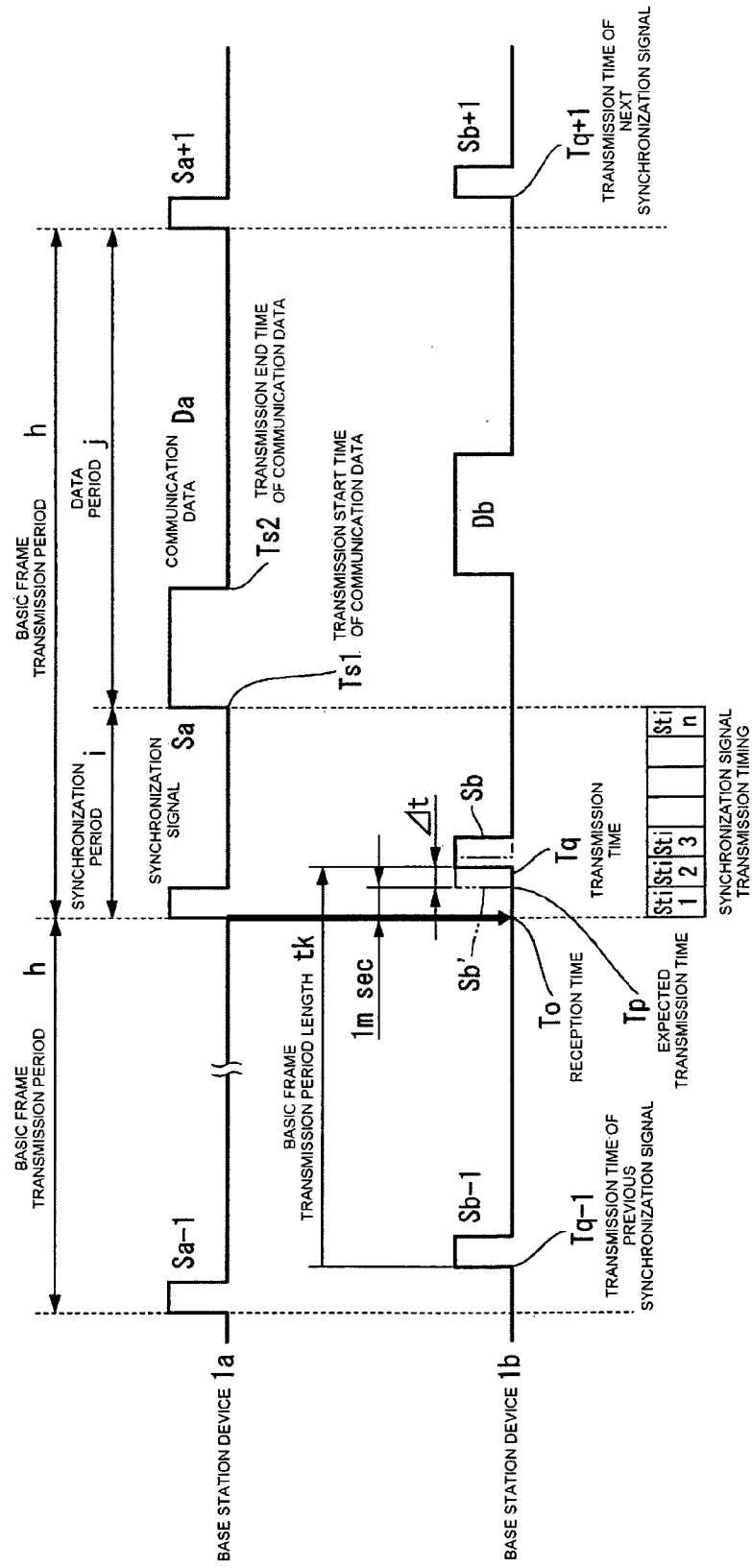
FIG. 6 is a first diagram illustrating a processing overview of the synchronization signal transmission processing.

FIG. 6 is a first diagram illustrating a processing overview of the synchronization signal transmission processing.

The base station device 1a is herein set as the reference station, whereas the base station devices 1b and 1c are set as the base station devices not serving as the reference station.

Next, referring to FIG. 5 and FIG. 6, description is given of processing in which each of the control sections 12 of the base station devices 1b and 1c not serving as the reference station receives the synchronization signal transmitted from the base station device 1a serving as the reference station, and determines, based on the synchronization signal, the transmission timing of the synchronization signal of the own device. Note that, the base station devices 1b and 1c both perform the same operation, and hence description of the base station device 1c is herein omitted.

First, when the base station device 1b not serving as the reference station receives data (Step S101), the synchronization signal detection section 14 determines whether or not the received data is the synchronization signal (Step S102). When it is determined in Step S102 that the synchronization signal has been received, the synchronization signal detection section 14 of the base station device 1b not serving as the reference station subsequently provides notification of the reception time to the timing determination section 15. Then, the timing determination section 15 records the reception time on a memory or the like (Step S103). Here, assuming that a time period from the rising edge of the synchronization signal to the falling edge thereof is 1 msec, the synchronization signal transmission timing Sti2 of the base station device 1b, whose synchronization signal transmission timing Sti is the second, is 1 msec after the rising edge of the synchronization signal Sa transmitted from the base station device 1a serving as the reference station in the synchronization period i. This timing is an expected transmission time Tp of an original synchronization signal Sb' of the base station device 1b, which is calculated based on a reception time To of the synchronization signal Sa of the base station device 1a.

Next, the timing determination section 15 of the base station device 1b not serving as the reference station makes a comparison between a transmission time Tq of the next synchronization signal Sb, that is, a transmission time Tq of the next synchronization signal Sb obtained based on the counting of its own, and the expected transmission time Tp of the synchronization signal Sb' of the base station device 1b (Steps S104 and S105). The transmission time Tq is obtained by adding a basic frame transmission period length tk to a transmission time Tq−1 of a previous synchronization signal Sb−1 (or a time corresponding to the synchronization signal transmission timing Sti2 of the base station device 1b from the start time of the synchronization period i of the basic frame transmission period h, which is notified by the management server 3). The expected transmission time Tp is calculated based on the reception time To of the synchronization signal Sa received from the base station device 1a serving as the reference station and the synchronization signal transmission timing Sti2 of the base station device 1b.

In a case where the synchronization signal Sb has not been transmitted yet, that is, a case where the transmission time Tq is later than the expected transmission time Tp, the base station device 1b uses the synchronization signal Sb to transmit notification indicating that the transmission timing of a next synchronization signal Sb+1 is to be corrected by Δt to the terminal device 2b to which the base station device 1b transmits the synchronization signal (Step S106). Then, the base station device 1b corrects the transmission time of the synchronization signal Sb+1, which is next to the synchronization signal Sb to be transmitted from the base station device 1b immediately after the synchronization signal Sa is received from the base station device 1a, into a transmission time Tq+1 of the synchronization signal Sb+1 of the base station device 1b, which is calculated based on the reception time To of the synchronization signal Sa received from the base station device 1a serving as the reference station and the synchronization signal transmission timing Sti2 of the base station device 1b (Step S107). Note that, the synchronization signal Sb, which is transmitted by the own device immediately after the reception of the synchronization signal received from the base station device 1a serving as the reference station, is transmitted based on the counting of the own device without any particular correction.

Figure 7:
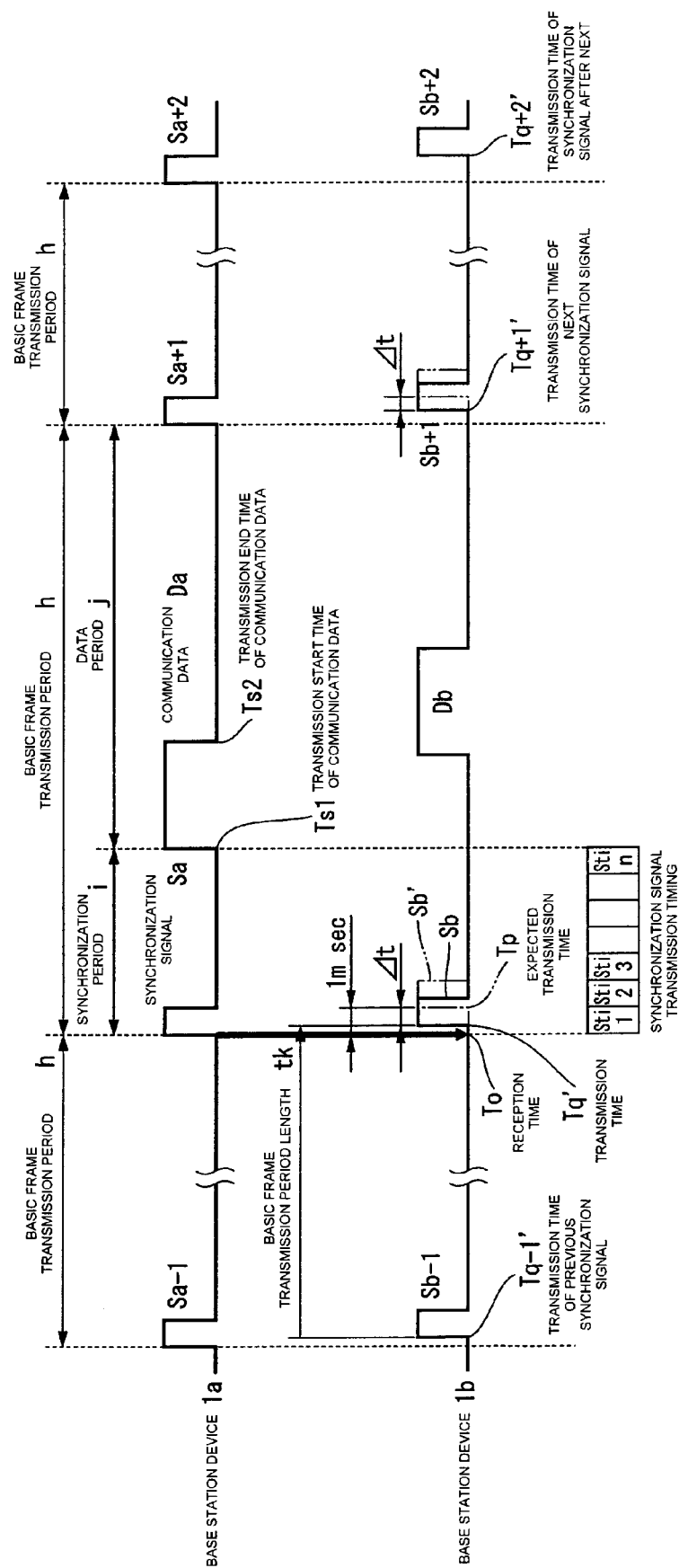
FIG. 7 is a second diagram illustrating a processing overview of correction processing for the synchronization signal.

Referring to FIG. 7, description is given of correction performed in a case where the synchronization signal Sb has already been transmitted on the other hand, that is, a case where a transmission time Tq' is earlier than the expected transmission time Tp.

As illustrated in FIG. 7, in the case where a transmission time Tq' of the synchronization signal Sb of the base station device 1b is earlier than the expected transmission time Tp, a determination that there is a time lag between the transmission time Tq' and the expected transmission time Tp is made after the base station device 1b has already provided notification of a transmission (reception) time Tq+1' of the next synchronization signal Sb+1 to the terminal device 2b to which the base station device 1b transmits the synchronization signal. Accordingly, the base station device 1b does not correct the transmission timing of the next synchronization signal Sb+1, and, instead, uses the synchronization signal Sb+1 to transmit notification indicating that the transmission timing of a synchronization signal Sb+2 after next is to be corrected by Δt to the terminal device 2b to which the base station device 1b transmits the synchronization signal (Step S108). Then, the transmission time of the synchronization signal Sb+2 after next of the base station device 1b is corrected to Tq+2' (Step S109).

In the processing described above, the base station device 1a, which transmits the synchronization signal Sa at the earliest synchronization signal transmission timing Sti, is set as the reference station, but a base station device whose synchronization signal transmission timing Sti is later than that of another base station device may be set as the reference station.

Figure 8:
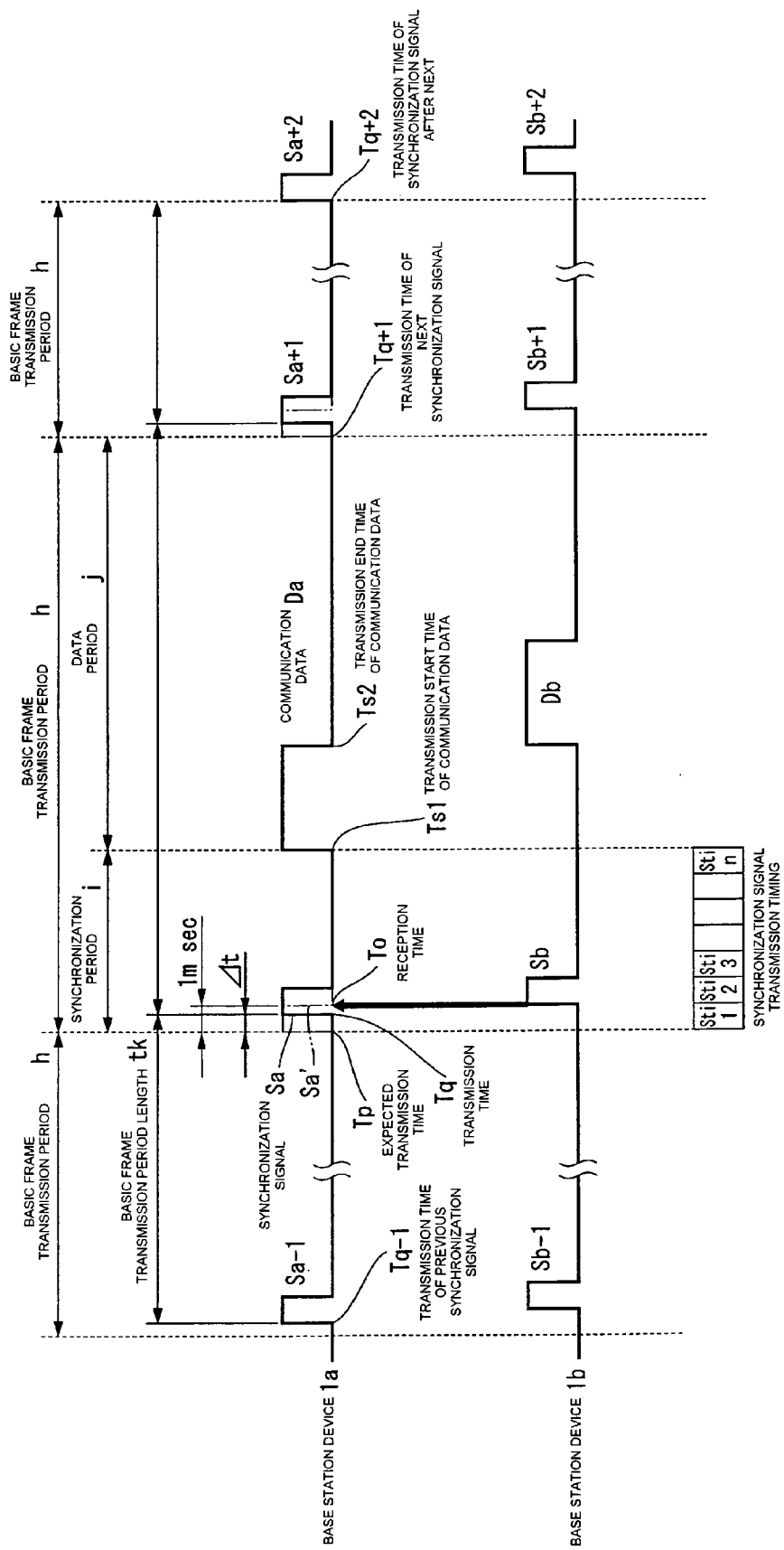
FIG. 8 is a third diagram illustrating a processing overview of the correction processing for the synchronization signal.

FIG. 8 is a third diagram illustrating a processing overview of correction processing for the synchronization signal.

Next, description is given of an example in which the transmission order of the base station device serving as the reference station is not the first.

First, it is assumed that each of the base station devices $1a$ to $1c$ has already received from the management server 3 notification indicating that the base station device $1b$ is the reference station. In response thereto, in a case where the base station device $1a$ was originally set as the reference station, the timing determination section 15 of the base station device $1a$ detects that the own device is no longer the reference station, terminates the operation as the reference station, and starts, based on the synchronization signal transmitted from the new reference station, processing of achieving synchronization of the start time of the basic frame transmission period and timings of the synchronization period and the data period. Further, in response to the reception of the notification indicating that the base station device $1b$ is to be set as the reference station, the timing determination section 15 of the base station device $1b$ stops the processing of achieving, based on the synchronization signal of another base station device $1a$ or $1c$, synchronization of the start time of the basic frame transmission period and the timings of the synchronization period and the data period. Then, the synchronization signal generation section 16 of the base station device $1c$ transmits the synchronization signal at the synchronization signal transmission timing (transmission order: third) in the synchronization period of the basic frame transmission period, which has been used until that time point.

Next, description is given of processing in which the control section 12 of each of the base station devices $1a$ and $1c$ not serving as the reference station receives the synchronization signal transmitted from the base station device $1b$ serving as the reference station, and determines, based on the synchronization signal, the transmission timing of the synchronization signal of the own device. Note that, the operation of the base station device $1c$ is the same as the operation of the base station device $1b$ which is performed in the above-mentioned case where the base station device $1a$ is set as the reference station, and hence description thereof is omitted herein. Further, the processing overview of the synchronization correction is the same as in FIG. 4, and hence the processing procedures are described with reference to FIG. 4.

First, when the base station device $1a$ not serving as the reference station receives data (Step S101), the synchronization signal detection section 14 determines whether or not the received data is the synchronization signal (Step S102). When it is determined in Step S102 that the synchronization signal has been received, the synchronization signal detection section 14 of the base station device $1a$ not serving as the reference station subsequently provides notification of the reception time to the timing determination section 15. Then, the timing determination section 15 records the reception time on a memory or the like (Step S103).

Next, the timing determination section 15 of the base station device $1a$ not serving as the reference station makes a comparison between a transmission time Tq of the next synchronization signal, that is, a transmission time Tq of the next synchronization signal obtained based on the counting of its own, and an expected transmission time Tp of the next synchronization signal of the own device (Step S104). The transmission time Tq is obtained by adding the basic frame transmission period length tk to a transmission time Tq−1 of a previous synchronization signal Sa−1. The expected transmission time Tp is calculated based on the reception time To of the synchronization signal Sb received from the base station device $1b$ serving as the reference station and the transmission order of the own device. Here, for example, considering that the transmission order of the base station device $1b$ serving as the reference station is the second, and that the synchronization signal transmission timing Sti1 of the base station device $1a$ not serving as the reference station is the first, the transmission time Tp of a next expected synchronization signal Sa' of the base station device $1a$, which can be calculated based on the synchronization signal Sb received from the base station device $1b$ serving as the reference station, can be determined through calculation as a time obtained by subtracting 1 msec, which corresponds to one synchronization signal, from the reception time To of the synchronization signal Sb transmitted from the base station device $1b$ serving as the reference station.

Then, a comparison is made between the transmission time Tq of the next synchronization signal Sa, that is, the transmission time Tq of the next synchronization signal Sa obtained based on the counting of its own, and the expected transmission time Tp of the synchronization signal Sa' of the own device (Step S104). The transmission time Tq is obtained by adding the basic frame transmission period length tk to the transmission time Tq−1 of the previous synchronization signal Sa−1. The expected transmission time Tp can be calculated based on the reception time To of the synchronization signal Sb received from the base station device $1b$ serving as the reference station and the synchronization signal transmission timing Sti1 of the own device. In a case where there is a time lag (Δt) between the reception time To and the expected transmission time Tp, it is determined whether or not the synchronization signal Sa of the base station device $1a$ has already been transmitted. In a case where the transmission time Tq of the synchronization signal Sa of the base station device $1a$ is earlier than the reception time To as in FIG. 8, that is, a case where the synchronization signal Sa has already been transmitted, a determination that there is a time lag between the transmission time Tq and the expected transmission time Tp is made after the base station device $1a$ has already provided notification of a transmission (reception) time Tq+1 of a next synchronization signal Sa+1 to the terminal device $2a$ to which the base station device $1a$ transmits the synchronization signal. Accordingly, the base station device $1a$ does not correct the transmission timing of the next synchronization signal Sa+1, and, instead, uses the synchronization signal Sa+1 to transmit notification indicating that the transmission timing of a synchronization signal Sa+2 after next is to be corrected by Δt to the terminal device $2a$ to which the base station device $1a$ transmits the synchronization signal (Step 108). Then, the transmission time of the synchronization signal Sa+2 after next of the base station device $1a$ is corrected to Tq+2 (Step 109).

In a case where the transmission time Tq of the synchronization signal Sa of the base station device $1a$ is later than the reception time To, that is, a case where the synchronization signal Sa has not been transmitted yet, though not illustrated in FIG. 6, the base station device $1a$ uses the synchronization signal Sa to transmit notification indicating that the transmission timing of the next synchronization signal Sa+1 is to be corrected by Δt to the terminal device $2a$ to which the base station device $1a$ transmits the synchronization signal (Step S106). Then, the base station device $1a$ corrects the transmission time of the synchronization signal Sa+1, which is next to the synchronization signal Sa to be transmitted from the base station device 1a immediately after the synchronization signal Sb is received from the base station device 1b, into the transmission time Tq+1 of the synchronization signal Sa+1 of the base station device 1a, which is calculated based on the reception time To of the synchronization signal Sb received from the base station device 1b serving as the reference station and the synchronization signal transmission timing Sti1 of the base station device 1a (Step S107).

Figure 9:
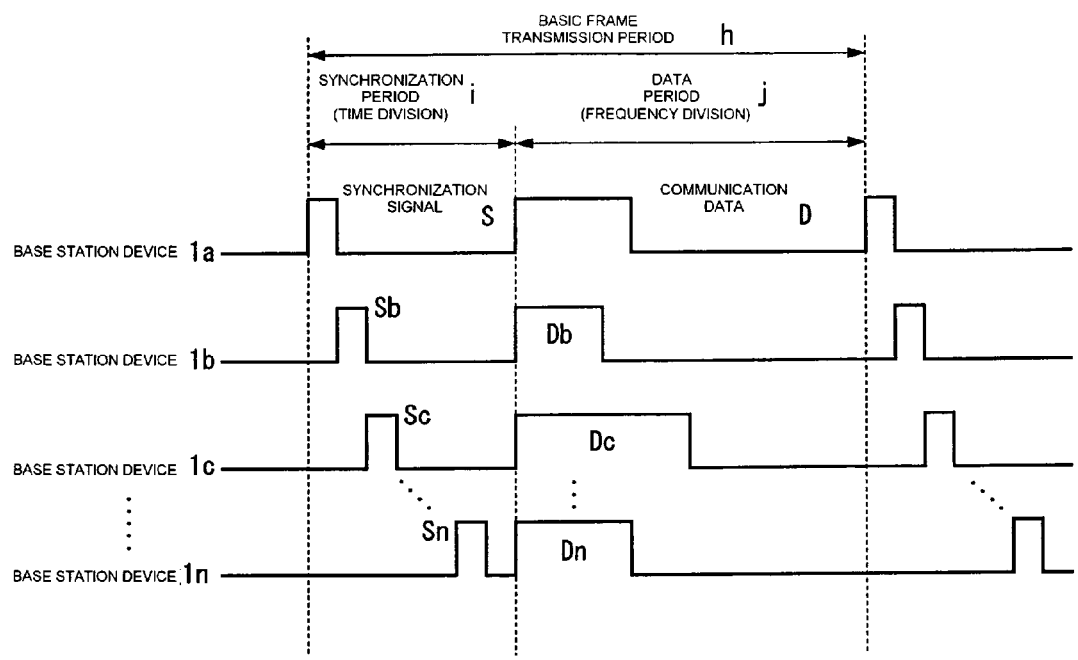
FIG. 9 is a second diagram illustrating a processing overview of the synchronization signal transmission processing.

In the description of the present invention, there has been given an example in which all the signals transmitted from the respective base station devices have the same radio frequency. However, as illustrated in FIG. 9, the transmission may be performed at a different radio frequency for the data period j in which the communication data D is transmitted, and, only for the synchronization period i in which the synchronization signal S is transmitted, the transmission may be performed at the same frequency through time division. In this case, only the synchronization signals S are transmitted from the base station devices 1 in synchronization through the same processing as the processing illustrated in FIG. 4 and FIG. 6.

Further, in order to avoid contention with another base station device, the synchronization signal transmitted from each base station device may be provided with a guard time.

Figure 10:
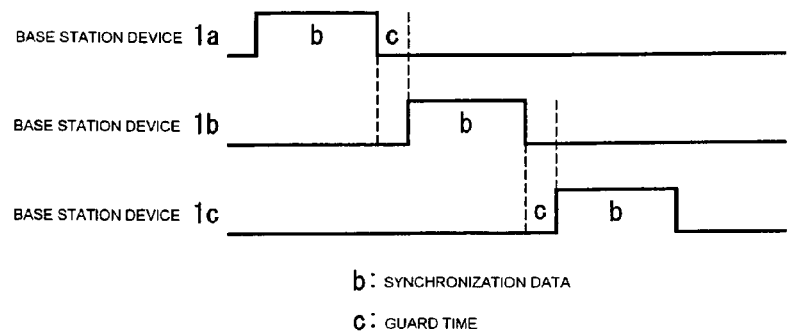
FIG. 10 is a diagram illustrating an overview of guard time insertion processing.

FIG. 10 is a diagram illustrating an overview of guard time insertion processing.

As illustrated in FIG. 10, in order to prevent the transmission periods of the synchronization signals from overlapping each other due to a clock error or a transmission delay, the base station device 1 whose transmission order is not the first may count a guard time c between a time at which the synchronization signal is transmitted from a base station device 1 that comes immediately before in transmission order and a time at which the synchronization signal is transmitted from the own device, and transmit the synchronization signal after the counting of the guard time c is finished.

In the processing described above, each of the base station devices 1 transmits the synchronization signal once in the synchronization period, but may continuously transmit a plurality of identical synchronization signals in the synchronization signal transmission period of the own device.

Figure 11:
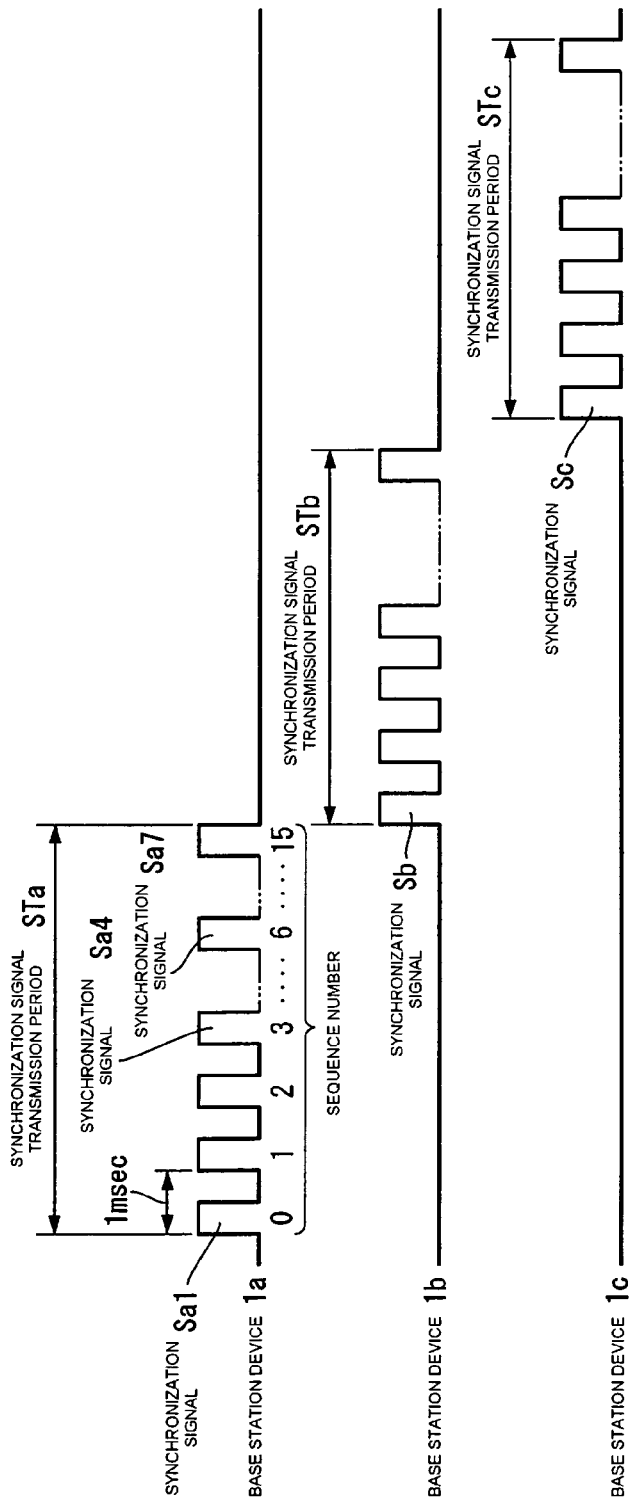
FIG. 11 is a diagram illustrating an overview of another transmission method for the synchronization signal.

FIG. 11 is a diagram illustrating an overview of another transmission method for the synchronization signal.

FIG. 11 illustrates an example in which the base station devices 1a, 1b, and 1c continuously transmit identical synchronization signals Sa, Sb, and Sc sixteen times in single synchronization signal transmission periods STa, STb, and STc, respectively. Note that, in the example of transmission of the synchronization signals S of FIG. 11, a transmission interval between the synchronization signals S in the synchronization signal transmission period ST is 1 msec. Here, as described with reference to FIG. 4, the terminal device 2 normally performs processing of: in order to receive the synchronization signal S from the base station device 1, being activated from the sleep state before the synchronization signal S is transmitted to wait for the synchronization signal S to be transmitted; after the reception of the synchronization signal S, transitioning to the sleep state again until a timing at which the next communication data is transmitted comes; and predicting a time at which the communication data D is to be transmitted to be activated from the sleep state again. However, in order to minimize the power consumption, it is desired that a time period used for waiting for the synchronization signal S to be transmitted be reduced as much as possible.

As illustrated in FIG. 11, the base station devices 1 transmit the identical synchronization signals S a plurality of times in the respective synchronization signal transmission periods ST. The terminal device 2 only needs to receive any one of the plurality of synchronization signals S. In a case where the terminal device 2 has received one of the plurality of synchronization signals S after the activation from the sleep state, the terminal device 2 transitions to the sleep state immediately. In this manner, even if the clock section serving as a reference for the synchronization signal of the terminal device 2 is not of high precision, it is possible to reduce the power consumption by reducing the time period used for waiting for the synchronization signal S to be received. Further, the plurality of synchronization signals S in the synchronization signal transmission period ST have stored therein sequence numbers (in the case of FIG. 11, numbers from 0 to 15), and hence, based on a sequence number contained in the synchronization signal S received first after the activation from the sleep state, the terminal device 2 corrects a predicted timing for the reception of the synchronization signal transmitted from the base station device. For example, when the predicted timing is set as a timing of Sa7, which is at the center of the synchronization signal transmission period ST, if a synchronization signal Sa4 having a sequence number 3 assigned thereto is the first signal received after the terminal device 2 was activated from the sleep state, this means that the terminal device 2 was activated from the sleep state earlier, relative to the synchronization signal Sa7 at the center, by a time period of 3 msec, which is obtained by multiplying 1 msec being a signal interval of the synchronization signal S by 3, because of the reception of Sa4, which is the third synchronization signal from the synchronization signal Sa7. The terminal device 2, which has made such a determination as described above, performs correction so that the activation time from the sleep state for reception of the next synchronization signal S is delayed by 3 msec.

Hereinabove, the embodiment of the present invention has been described. According to the processing described above, the management server provides, to the base station devices, notification of the transmission order of the synchronization signal and of the base station device that is to serve as the reference station. Based on the synchronization signal transmitted from the base station device designated as the reference station through the notification, each of the base station devices not serving as the reference station determines the timing of the synchronization signal by the own device and transmits the synchronization signal. With this configuration, the management server does not need to perform processing of calculating when the synchronization signal is to be transmitted from each of the base station devices, and hence it is possible to reduce a processing load imposed on the management server. Further, the base station device serving as the reference station only needs to transmit the synchronization signal at the synchronization signal transmission timing corresponding to the transmission order in the synchronization period after the reception of the notification of the transmission order from the management server. As a result, the base station device serving as the reference station does not need to perform processing of calculating when to transmit the synchronization signal, and hence it is possible to reduce the processing load imposed thereon.

Note that, the above-mentioned devices and server each include a computer system. Then, each of the procedures of the processing described above is stored in a computer-readable recording medium in a form of program, and the above-mentioned processing is performed by a computer reading and executing the program. Here, the computer-readable recording medium refers to a magnetic disk, a magneto-optical disk, a CD-ROM, a DVD-ROM, a semiconductor memory, and the like. Alternatively, the computer program may be distributed to the computer via a communication line so that the computer that receives the distribution executes the program.

Further, the above-mentioned program may be a program that implements part of the above-mentioned function. Further, the above-mentioned program may be a program that implements the above-mentioned function in combination with a program that is already recorded in the computer system, that is, a so-called differential file (differential program).

REFERENCE SIGNS LIST

1 . . . base station device
2 . . . terminal device
3 . . . management server
11 . . . radio reception section
12 . . . control section
13 . . . clock section
14 . . . synchronization signal detection section
15 . . . timing determination section
16 . . . synchronization signal generation section
17 . . . radio transmission section

The invention claimed is:

1. A communication system comprising:
a management device;
a plurality of base station devices in communication with the management device; and
a plurality of terminal devices each in communication with a corresponding one of the base station devices,
wherein the management device comprises a transmission order notification section that notifies each of the plurality of base station devices of a transmission order of a synchronization signal; and a reference base station device notification section that notifies each of the plurality of base station devices of which one of the plurality of base station devices is designated by the management device to serve as a reference; and
wherein each one of the plurality of base station devices comprises a synchronization signal transmission section that transmits a synchronization signal based on the transmission order of the one base station device, in a case where the one base station device has been designated by the management device to serve as the reference, and that transmits a synchronization signal at a timing calculated based on (1) a reception time when the one base station device has received the synchronization signal transmitted from the base station device designated by the management device to serve as the reference, (2) the transmission order of the base station device designated by the management device to serve as the reference, and (3) the transmission order of the one base station device, in a case where the one base station device has not been designated by the management device to serve as the reference.

2. A communication system according to claim 1, wherein in a case where the one base station device has not been designated by the management device to serve as the reference and where another of the plurality of base station devices that follows the one base station device in the transmission order has been designated by the management device to serve as the reference, the synchronization signal transmission section of the each of the plurality of base station devices transmits a synchronization signal after next, the timing calculated based on (1) the reception time when the one base station device has received the synchronization signal transmitted from the base station device designated to serve as the reference, (2) the transmission order of the base station device designated to serve as the reference, and (3) the transmission order of the one base station device.

3. A communication system according to claim 2, wherein the synchronization signal transmission section of the each of the plurality of base station devices provides a guard time between a transmission time of a synchronization signal, which is transmitted from another base station device notified of a transmission order that is immediately before the transmission order of the one base station device, and a transmission time of the synchronization signal to be transmitted from the one base station device.

4. A communication system according to claim 3, wherein the synchronization signal transmission section of the each of the plurality of base station devices continuously transmits the synchronization signal a plurality of times with a different piece of identification information assigned thereto, and
wherein each of the terminal devices is configured to perform processing to achieve synchronization with each of the plurality of base station devices based on the synchronization signal received first after the corresponding terminal is activated, to correct a time of a next activation timing based on the identification information assigned to the synchronization signal, and to store the corrected time.

5. A communication system according to claim 2, wherein the synchronization signal transmission section of the each of the plurality of base station devices continuously transmits the synchronization signal a plurality of times with a different piece of identification information assigned thereto, and
wherein each of the terminal devices is configured to perform processing to achieve synchronization with each of the plurality of base station devices based on the synchronization signal received first after the corresponding terminal is activated, to correct a time of a next activation timing based on the identification information assigned to the synchronization signal, and to store the corrected time.

6. A communication system according to claim 1; wherein the synchronization signal transmission section of the each of the plurality of base station devices provides a guard time between a transmission time of a synchronization signal, which is transmitted from another base station device notified of a transmission order that is immediately before the transmission order of the one base station device, and a transmission time of the synchronization signal to be transmitted from the one base station device.

7. A communication system according to claim 6, wherein the synchronization signal transmission section of the each of the plurality of base station devices continuously transmits the synchronization signal a plurality of times with a different piece of identification information assigned thereto, and
wherein each of the terminal devices is configured to perform processing to achieve synchronization with each of the plurality of base station devices based on the synchronization signal received first after the corresponding terminal is activated, to correct a time of a next activation timing based on the identification information assigned to the synchronization signal, and to store the corrected time.

8. A communication system according to claim 1, wherein the synchronization signal transmission section of the each of the plurality of base station devices continuously transmits the synchronization signal a plurality of times with a different piece of identification information assigned thereof, and
wherein each of the terminal devices is configured to perform processing to achieve synchronization with each of the plurality of base station devices based on the synchronization signal received first after the corresponding terminal is activated, to correct a time of a next activation timing based on the identification information assigned to the synchronization signal, and to store the corrected time.

9. A communication method for a communication system, the method comprising:
providing a management device comprising a transmission order notification section and a reference base station device notification section;
providing a plurality of base station devices in communication with the management device, each of the base station devices comprising a synchronization signal transmission section;
providing a plurality of terminal devices each in communication with a corresponding one of the base station devices;
providing to each of the plurality of base station devices, by the transmission order notification section of the management device, a notification of a transmission order of a synchronization signal;
providing to the each of the plurality of base station devices, by the reference base station device notification section of the management device, a notification of a base station device that is designated to serve as a reference out of the plurality of base station devices;
transmitting, by the synchronization signal transmission section of each one of the base station devices, a synchronization signal based on the transmission order of the one base station device in a case where the one base station device has been designated by the management device to serve as the reference; and
transmitting, by the synchronization signal transmission section of each one of the base station devices, the synchronization signal at a timing calculated based on (1) a reception time when the one base station device has received the synchronization signal transmitted from the base station device designated by the management device to serve as the reference, (2) the transmission order of the base station device designated by the management device to serve as the reference, and (3) the transmission order of the one base station device in a case where the one base station device has not been designated by the management device to serve as the reference.

10. A communication method according to claim 9, further comprising transmitting, by the synchronization signal transmission section of the each of the plurality of base station devices, in a case where the one base station device has not been designated by the management device to serve as the reference and where another of the plurality of base station devices that follows the one base station device in the transmission order has been designated by the management device to serve as the reference, a synchronization signal after next, at the timing calculated based on (1) the reception time when the one base station device has received the synchronization signal transmitted from the base station device designated to serve as the reference, (2) the transmission order of the base station device designated to serve as the reference, and (3) the transmission order of the one base station device.

11. A communication method according to claim 10, further comprising providing, by the synchronization signal transmission section of the each of the plurality of base station devices, a guard time between a transmission time of a synchronization signal, which is transmitted from another of base station device notified of a transmission order that is immediately before the transmission order of the one base station device, and a transmission time of the synchronization signal to be transmitted from the one base station device.

12. A communication method according to claim 11, further comprising:
continuously transmitting, by the synchronization signal transmission section of the each of the plurality of base station devices, the synchronization signal a plurality of times with a different piece of identification information assigned thereto; and
performing, by each of the terminal devices, processing to achieve synchronization with the corresponding one of the plurality of base station devices based on the synchronization signal received first after the each of the terminal devices is activated, correcting, by the each of the terminal devices, a time of a next activation timing based on the identification information assigned to the synchronization signal, and storing the corrected time.

13. A communication method according to claim 10, further comprising:
continuously transmitting, by the synchronization signal transmission section of the each of the plurality of base station devices, the synchronization signal a plurality of times with a different piece of identification information assigned thereto; and
performing, by each of the terminal devices, processing to achieve synchronization with the corresponding one of the plurality of base station devices based on the synchronization signal received first after the each of the terminal devices is activated, correcting, by the each of the terminal devices, a time of a next activation timing based on the identification information assigned to the synchronization signal, and storing the corrected time.

14. A communication method according to claim 9, further comprising providing, by the synchronization signal transmission section of the each of the plurality of base station devices, a guard time between a transmission time of a synchronization signal, which is transmitted from another of base station device notified of a transmission order that is immediately before the transmission order of the one base station device, and a transmission time of the synchronization signal to be transmitted from the one base station device.

15. A communication method according to claim 14, further comprising:
continuously transmitting, by the synchronization signal transmission section of the each of the plurality of base station devices, the synchronization signal a plurality of times with a different piece of identification information assigned thereto; and
performing, by each of the terminal devices, processing to achieve synchronization with the corresponding one of the plurality of base station devices based on the synchronization signal received first after the each of the terminal devices is activated, correcting, by the each of the terminal devices, a time of a next activation timing based on the identification information assigned to the synchronization signal, and storing the corrected time.

16. A communication method according to claim 9, further comprising:
continuously transmitting, by the synchronization signal transmission section of the each of the plurality of base station devices, the synchronization signal a plurality of times with a different piece of identification information assigned thereto; and
performing, by each of the terminal devices, processing to achieve synchronization with the corresponding one of the plurality of base station devices based on the synchronization signal received first after the each of the terminal devices is activated, correcting, by the each of the terminal devices, a time of a next activation timing based on the identification information assigned to the synchronization signal, and storing the corrected time.

17. A communication system comprising:

a pair of groups of terminal devices;

a pair of base station devices in respective communication with the pair of groups of terminal devices; and a management device in communication with the pair of base station devices, the management device having a transmission order notification section configured to provide to each of the base station devices notification of a transmission order of a synchronization signal, and having a reference base station device notification section configured to provide to each of the base station devices a notification that one of the two base station devices has been designated as a reference base station device, wherein each of the pair of base station devices has a synchronization signal transmission section configured to transmit a synchronization signal, wherein when one of the pair of base station devices has been designated as the reference base station device, the synchronization signal transmission section of the reference base station device transmits a synchronization signal, and wherein when the one of the pair of base station devices has not been designated as the reference base station device and the other of the pair of base station devices has been designated as the reference base station device, the synchronization signal transmission section of the one of the pair of base station devices transmits a synchronization signal at a timing calculated based on (1) a reception time when the one of the pair of base station devices has received the synchronization signal transmitted from the other of the pair of base station devices, (2) a transmission order of the other of the pair of base station devices, and (3) the transmission order of the one of the pair of base station devices.

18. A communication system according to claim 17, wherein the synchronization signal transmission section of one of the pair of base station devices provides a guard time between a transmission time of a synchronization signal, which is transmitted from the other of the pair of base station devices notified of a transmission order that is immediately before the transmission order of the one base station device, and a transmission time of the synchronization signal to be transmitted from the one base station device.

* * * * *